(12) United States Patent
Hitzler et al.

(10) Patent No.: US 8,233,783 B2
(45) Date of Patent: Jul. 31, 2012

(54) APPARATUS FOR UTILIZING WATER

(75) Inventors: Alfred Hitzler, Mochenwangen (DE); Guido Wegner, Schlier (DE)

(73) Assignee: Venta-Luftwäscher GmbH, Weingarten (DE)

( * ) Notice: Subject to any disclaimer, the term of this patent is extended or adjusted under 35 U.S.C. 154(b) by 828 days.

(21) Appl. No.: 12/358,440

(22) Filed: Jan. 23, 2009

(65) Prior Publication Data

US 2009/0190907 A1 Jul. 30, 2009

Related U.S. Application Data

(63) Continuation of application No. PCT/DE2007/001319, filed on Jul. 25, 2007.

(30) Foreign Application Priority Data

| Jul. 26, 2006 | (DE) | 10 2006 035 215 |
| Dec. 19, 2006 | (DE) | 10 2006 060 479 |
| Jul. 25, 2007 | (DE) | 10 2007 035 200 |

(51) Int. Cl.
*A01G 13/06* (2006.01)
*H05B 3/60* (2006.01)

(52) U.S. Cl. .......... 392/387; 392/322; 392/331

(58) Field of Classification Search .......... None
See application file for complete search history.

(56) References Cited

U.S. PATENT DOCUMENTS

| 788,905 | A | * | 5/1905 | Hill | 392/311 |
| 1,017,874 | A | * | 2/1912 | Kelso | 392/311 |
| 1,352,547 | A | * | 9/1920 | Seimbille | 392/311 |
| 2,058,054 | A | * | 10/1936 | Bidwell | 392/311 |
| 3,025,385 | A | * | 3/1962 | Tanaka | 219/50 |
| 3,219,796 | A | * | 11/1965 | Graf et al. | 392/327 |
| 3,584,193 | A | * | 6/1971 | Badertscher | 392/328 |
| 3,775,589 | A | | 11/1973 | Camp | |
| 3,944,785 | A | * | 3/1976 | Eaton-Williams | 392/326 |
| 4,146,775 | A | | 3/1979 | Kirchner et al. | |
| 4,347,429 | A | * | 8/1982 | Will | 392/325 |
| 4,422,917 | A | * | 12/1983 | Hayfield | 204/196.01 |
| 5,833,812 | A | * | 11/1998 | Hartman | 203/1 |
| 6,522,834 | B1 | * | 2/2003 | Herrick et al. | 392/311 |
| 7,068,924 | B2 | | 6/2006 | Watanabe et al. | |
| 7,190,886 | B2 | * | 3/2007 | Dubicki et al. | 392/326 |
| 7,327,951 | B2 | * | 2/2008 | Chaput | 392/493 |
| 7,403,701 | B2 | * | 7/2008 | Choi et al. | 392/316 |
| 2004/0045909 | A1 | | 3/2004 | Tomioka | |
| 2007/0223892 | A1 | * | 9/2007 | Chaput | 392/311 |
| 2008/0131103 | A1 | * | 6/2008 | Nordmann | 392/387 |

FOREIGN PATENT DOCUMENTS

| CA | 1 265 471 A1 | 2/1990 |
| DE | 27 40 096 A1 | 3/1978 |
| DE | 44 14 045 A1 | 10/1995 |
| DE | 10 2004 001 897 A1 | 8/2005 |
| EP | 0 140 287 A2 | 5/1985 |
| JP | 08-132051 A1 | 5/1996 |
| JP | 10-281501 A1 | 10/1998 |
| JP | 2003-251356 A1 | 9/2003 |
| WO | 2006/114414 A1 | 11/2006 |

* cited by examiner

*Primary Examiner* — Thor Campbell
(74) *Attorney, Agent, or Firm* — Burr & Brown

(57) ABSTRACT

An apparatus for utilizing water such as, for example, an atomizer or vaporizer, having at least one container for water. Here, two ceramic electrodes that can be used to treat the water are arranged for the purpose of improving the water quality in the container.

15 Claims, 3 Drawing Sheets

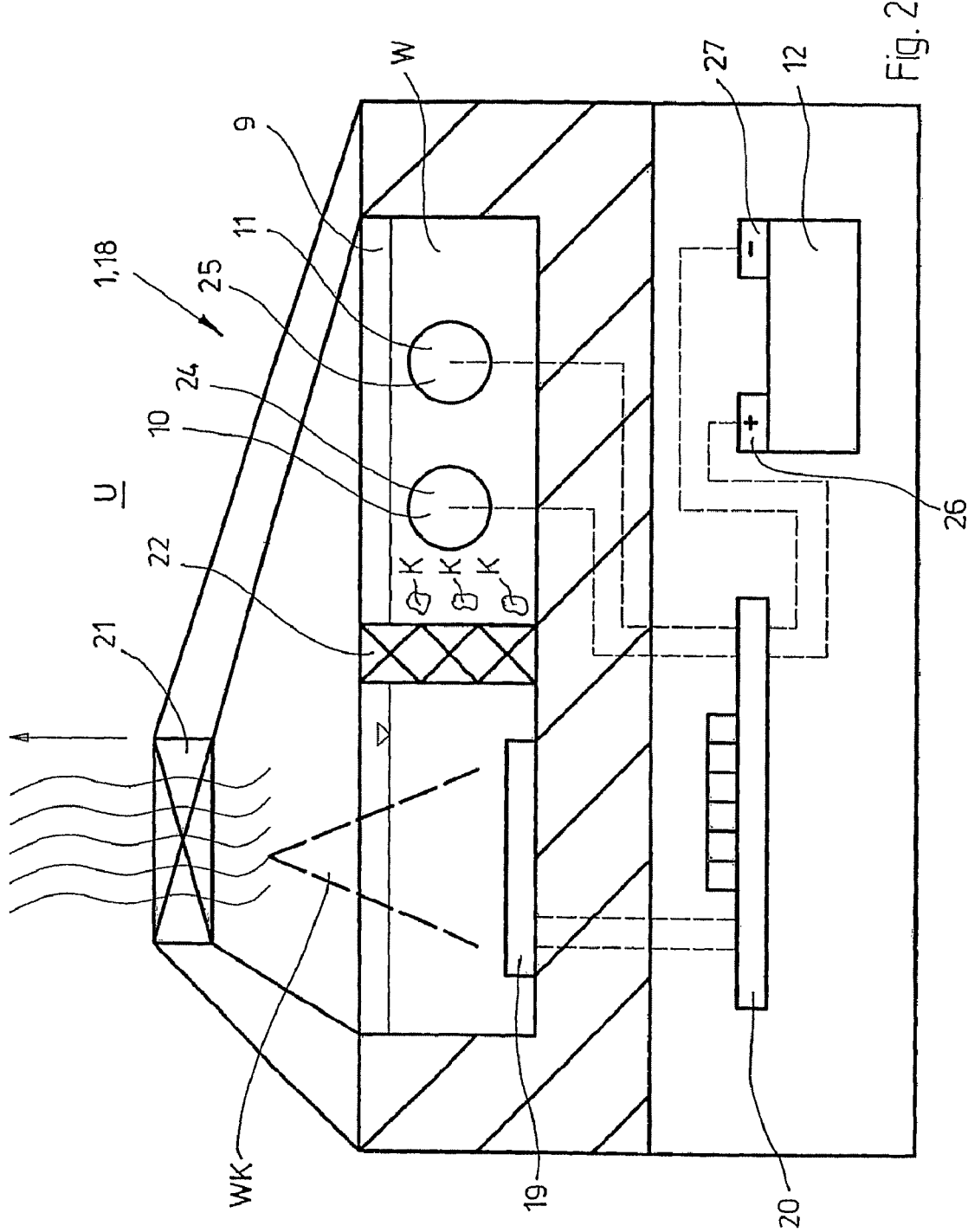

US 8,233,783 B2

APPARATUS FOR UTILIZING WATER

CROSS REFERENCE TO RELATED APPLICATIONS

This application is a continuation of International Application No. PCT/DE2007/001319, filed Jul. 25, 2007, which designated the United States, and claims the benefit under 35 USC §119(a)-(d) of German Application Nos. 10 2006 035 215.7 filed Jul. 26, 2006 and 10 2006 060 479.2, filed Dec. 19, 2006, the entireties of which are incorporated herein by reference.

FIELD OF THE INVENTION

The invention relates to an apparatus for utilizing water, such as, an atomizer or vaporizer, having at least one container for water, and to increase the water quality by having two ceramic electrodes arranged in the container to treat the water.

BACKGROUND OF THE INVENTION

JP 10-281501 A1 discloses an apparatus for utilizing water that is designed as an atomizer and has two containers for water. Here, the second container, from which the water is atomized, is fed from the first container. Chlorine-generating electrodes made from platinum and iridium are arranged in the first container in order to sterilize the water. Disadvantages of such an apparatus for utilizing water are, on the one hand, escape of unpleasantly smelling chlorine gas and, on the other hand, in some circumstances inadequate sterilization of the water when the latter is stored for a relatively long time before being atomized in the second container, which is arranged downstream of the first container. Furthermore, oxidizing substances are required that lead to undesired deposits in the container.

SUMMARY OF THE INVENTION

It is the object of the invention to develop an apparatus for utilizing water that is more secure against contamination, does not produce any unpleasant smelling gases and requires no oxidizing substances.

The inventive apparatus for utilizing water has two ceramic electrodes that serve to improve the water quality in the container from which water can be directly extracted, or water can be directly consumed. The use of ceramic electrodes necessitates no oxidizing substances, and all that is produced during operation is oxygen, which does not lead to the perception of an odor nuisance. The arrangement of the ceramic electrodes in the container from which water is directly extracted, or from which water is directly consumed, avoids a water accumulator lying between the location of treatment and the location where the water is extracted or consumed. The core of the invention is thus the use of ceramic electrodes and their positioning in the container from which the water is extracted or consumed. By contrast with the prior art, this results in a reduced risk of contamination after the treatment of the water, and in water treatment that is environmentally friendly and lacks odor.

The invention provides for the use of two electrically conducting ceramic electrodes that are connected to a DC power source. As a result, catalytic processes of oxygen radical formation proceed under electric voltage and trigger an oxidation of the biological compounds in the water and, in particular, a destruction of the cell membranes.

Furthermore, the invention provides for carrying out a polarity reversal at the ceramic electrodes at specific time intervals. The location of the oxygen radical formation is displaced hereby between the electrodes and uniform wearing of the two ceramic electrodes is achieved.

According to the invention, the DC power source makes available a voltage between 2 V and 50 V and, in particular, approximately 24 V to 30 V. Good success in sterilization can be attained with such values.

The invention further provides to carry out the polarity reversal every 2 minutes to 20 minutes and, in particular, approximately every 5 minutes. With the aid of such values, it is possible to attain a good compromise between the stipulation of uniform wearing of the ceramic electrodes and the stipulation of using as little treatment time as possible in starting up the catalytic processes.

The invention provides to limit the current flow to at most 100 mA. The operating costs can thereby be kept low.

Finally, the invention provides for the water treated with the ceramic electrodes to be led through a filter before being extracted or before being consumed. It is thereby possible to employ simple means to restrain lime deposits resulting from decalcification effected by the ceramic electrodes.

Within the meaning of the invention, a treatment of the water in the container is understood as a sterilization and/or decalcification of the water.

BRIEF DESCRIPTION OF THE DRAWINGS

Further details of the invention are described in the drawing with the aid of schematically illustrated exemplary embodiments.

FIG. 1b shows a plan view of the lower part of the apparatus shown in FIG. 1a;

FIG. 2 shows a schematic view of an apparatus according to another embodiment of the invention.

DETAILED DESCRIPTION OF THE INVENTION

Figure 1A:
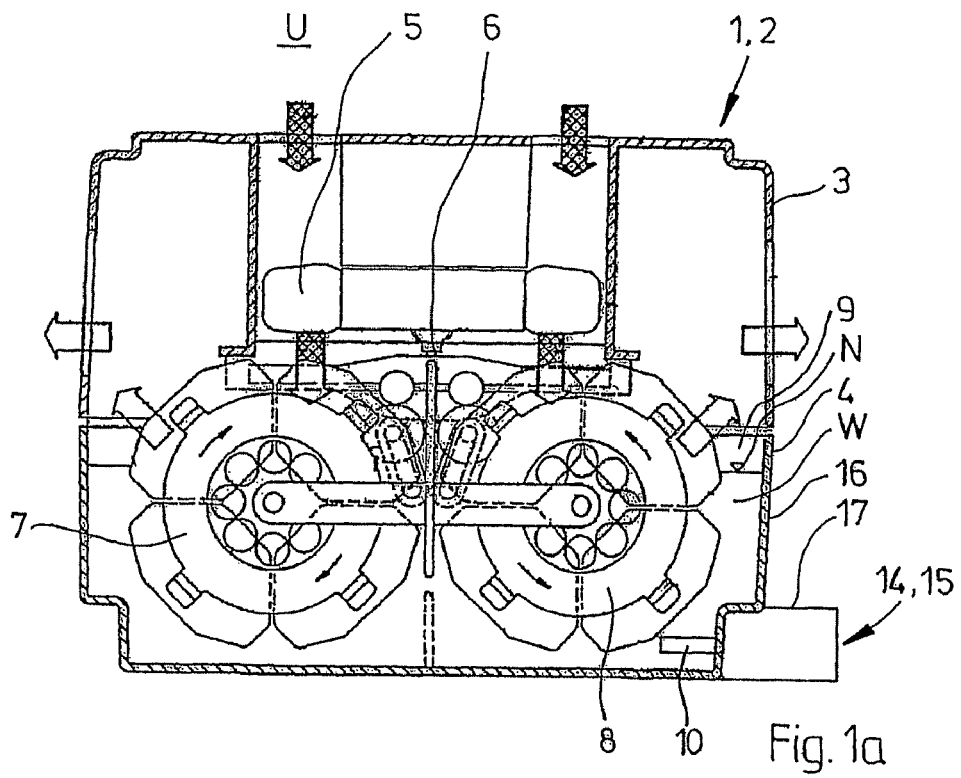
FIG. 1a shows a cutaway side view of an apparatus according to one embodiment of the invention.
Figure 1B:
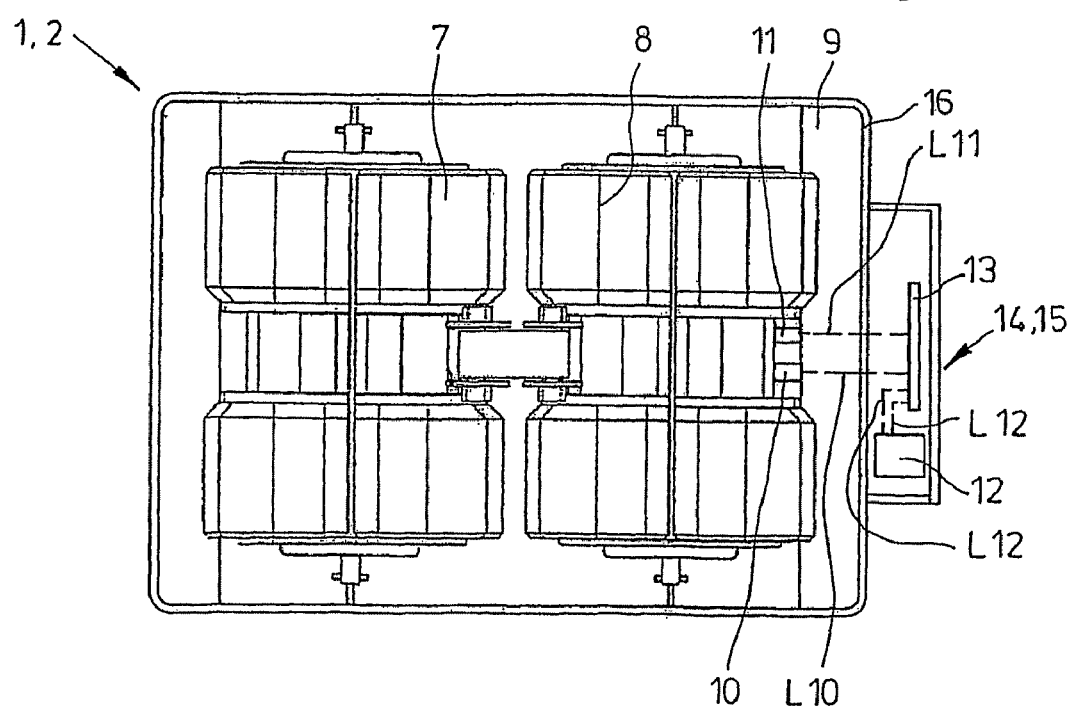

An apparatus 1 for utilizing water W is illustrated in a cutaway side view in FIG. 1a. The apparatus 1 is designed as a vaporizer 2 with the aid of which the water W can be vaporized in order to raise a level of atmospheric humidity in an environment U by means of cold vaporization. The apparatus 1 is based in principle on an apparatus for treating gases described in DE 44 14 045 A1. The apparatus 1 essentially comprises an upper part 3 and a lower part 4. Arranged in the upper part 3 are a fan 5 and a drive 6 for the rolls 7 and 8 rotatably mounted in the lower part 4. The lower part 4 forms a container 9 for the water W. The container 9 is filled with water up to a level N. The rolls 7 and 8 rotate slowly in the water W in order to vaporize the water W, and are driven in this case by the drive 6. Furthermore, the fan 5 blows ambient air over the rolls 7 and 8, the humidity of which is increased upon passing over the rolls 7 and 8. Two ceramic electrodes 10 and 11 are arranged in the container 9 (see also FIG. 1b). As is to be gathered from FIG. 1b, the two ceramic electrodes 10, 11 are connected to a DC power source 12. An electronic system 13 that controls the current flow and undertakes a polarity reversal at given time intervals is also connected between the DC power source 12 and the electrodes 10, 11. The electronic system 13 is connected to the electrodes 10 and 11 via electric lines L10 and L11. The DC power source 12 supplies the electronic system via lines L12. The electrodes 10, 11, the DC power source 12 and the electronic system 13 are combined in a housing 14 as a module 15 that can be fitted on a trough 16 forming the container 9. The housing 14 is closed in FIG. 1*a*, and illustrated with the cover 17 removed in FIG. 1*b*.

A second embodiment of an apparatus 1 for utilizing water W is illustrated in FIG. 2 in a schematic side view. The apparatus 1 is designed as an atomizer 18 with the aid of which the water W can be atomized or sprayed into an environment U. For the atomization, the apparatus 1 has in a container 9 an oscillating plate 19 that is excited to oscillate by an electronic system 20. Via the oscillating plate 19, this produces a water cone WK composed of very fine water droplets. The latter are blown out of the apparatus 1 into the environment U by means of a fan 21. Also arranged in the container 9 are two ceramic electrodes 10, 11 that are connected to a positive pole 26 and a negative pole 27 of a DC power source 12 with the interposition of the electronic system 20. The electronic system 20 controls a current flow and carries out a polarity reversal at the electrodes 10, 11 at prescribed intervals. The electrodes therefore operate alternately as anode 24 and as cathode 25. Lime deposits K resulting from the activity of the ceramic electrodes 10, 11 in the water W are kept away from the oscillating plate 19 by a filter 22. This prevents impairment of the functioning of the oscillating plate 19 by the lime deposits K.

Figure 3:
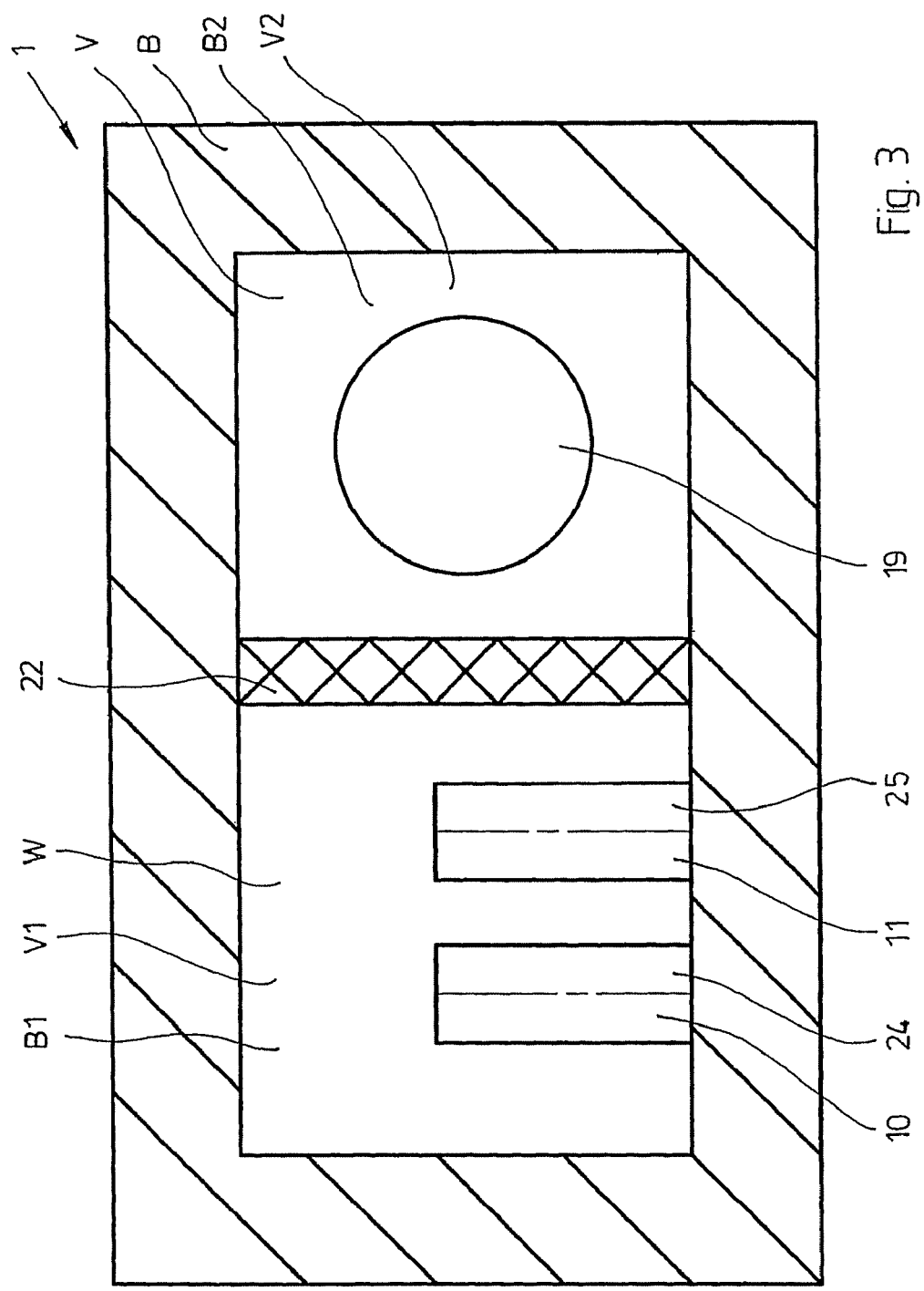
FIG. 3 shows a plan view of an apparatus according to another embodiment of the invention.

FIG. 3 illustrates a plan view of a third embodiment of an apparatus 1 whose mode of operation corresponds to the apparatus shown in FIG. 2. The apparatus 1 comprises a container B that is constructed from a nonconducting material 23 such as plastic, for example. The container B with a total volume V is subdivided by a filter 22 into a first part container B1 with a volume V1, and a second part container B2 with a volume V2. Arranged in the first part container B1 are two electrodes 10, 11 that are connected to a power source (not illustrated). The electrodes 10, 11 are alternately connected to a positive pole and a negative pole of the power source, and therefore alternately form an anode 24 and a cathode 25. Water W is treated in the first part container B1 by the electrodes 10, 11 and flows through the filter 22 into the second part container B2. The water W is atomized by an oscillating plate 19 in the second part container B2.

The invention is not restricted to exemplary embodiments illustrated or described. Rather, it comprises developments of the invention within the scope of the patent claims. In particular, the invention also provides to design the apparatus for utilizing water as a coffee machine, tea machine or drinking water dispenser.

LIST OF REFERENCE SYMBOLS

1 Apparatus for utilizing water
2 Vaporizer
3 Upper part of 2
4 Lower part of 2
5 Fan of 2
6 Drive for 7 and 8
7 Roll
8 Roll
9 Container
10 Electrode made from ceramic or oxide ceramic
11 Electrode made from ceramic or oxide ceramic
12 DC power source
13 Electronic system
14 Housing
15 Module
16 Trough
17 Cover of 14
18 Atomizer
19 Oscillating plate of 18
20 Electronic system
21 Fan
22 Filter
23 Nonconducting material
24 Anode
25 Cathode
26 Positive pole
27 Negative pole
B Container
B1, B2 First and second part containers
K Lime deposit
L10 Line
L11 Line
U Line
U Environment of 1
V, V1, V2 Volumes of B, B1, B2
W Water
WK Water cone

The invention claimed is:

1. An apparatus for treating water comprising a first electrode made from ceramic and a second electrode made from ceramic, the two electrodes being arranged in a container consisting of a nonconducting material, wherein the electrodes are applied alternately as anode and as cathode by connection to a positive pole or a negative pole of a power source, and
   wherein a polarity of each of the electrodes is periodically reversed to displace a location of oxygen radical formation.

2. The apparatus as claimed in claim 1, wherein the ceramic of at least one of the first and second electrodes is an oxide ceramic.

3. The apparatus as claimed in claim 1, wherein the ceramic of at least one of the first and second electrodes is titanium oxide.

4. The apparatus as claimed in claim 1, wherein the power source has a voltage between 2 V and 50 V.

5. The apparatus as claimed in claim 1, wherein a polarity reversal takes place every 2 minutes to 20 minutes.

6. The apparatus as claimed in claim 1, wherein the current flow is at most 100 mA.

7. The apparatus as claimed in claim 1, wherein the water treated with the electrodes flows through a filter before being extracted from the container or before being consumed.

8. The apparatus as claimed in claim 1, wherein the container is separated by a filter into a first part container and a second part container, the two electrodes are arranged in the first part container, and treated water is extracted from the second part container.

9. The apparatus as claimed in claim 8, wherein the first part container has a greater volume than the second part container.

10. The apparatus as claimed in claim 9, wherein the volume of the first part container is at least twice as large as the volume of the second part container.

11. The apparatus as claimed in claim 9, wherein the container has a total volume of up to 1 liter.

12. The apparatus as claimed in claim 1, wherein the power source has a voltage between 24 V and 30 V.

13. The apparatus as claimed in claim 1, wherein a polarity reversal takes place every 5 minutes.

14. An atomizer comprising the apparatus of claim 1.

15. A vaporizer comprising the apparatus of claim 1.

* * * * *